(12) United States Patent
Rakvic et al.

(10) Patent No.: US 7,424,576 B2
(45) Date of Patent: Sep. 9, 2008

(54) PARALLEL CACHELETS

(75) Inventors: Ryan N. Rakvic, Santa Clara, CA (US);
John P. Shen, San Jose, CA (US);
Deepak Limaye, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 09/891,523

(22) Filed: Jun. 27, 2001

(65) Prior Publication Data

US 2002/0188806 A1 Dec. 12, 2002

Related U.S. Application Data

(60) Provisional application No. 60/287,707, filed on May 2, 2001.

(51) Int. Cl.
*G06F 12/00* (2006.01)

(52) U.S. Cl. ............... 711/118; 711/150; 711/168; 711/210

(58) Field of Classification Search ............... 711/118
See application file for complete search history.

(56) References Cited

U.S. PATENT DOCUMENTS

| 4,905,141 A | 2/1990 | Brenza |
| 5,210,842 A | 5/1993 | Sood |
| 5,381,533 A | 1/1995 | Peleg et al. |
| 5,410,668 A | 4/1995 | Hilton |
| 5,432,947 A | 7/1995 | Doi |
| 5,495,617 A | 2/1996 | Yamada |
| 5,530,932 A | 6/1996 | Carmean et al. |
| 5,630,146 A | 5/1997 | Conary et al. |
| 5,632,038 A | 5/1997 | Fuller |
| 5,634,131 A | 5/1997 | Matter et al. |
| 5,666,513 A | 9/1997 | Whittaker |
| 5,666,537 A | 9/1997 | Debnath et al. |
| 5,752,045 A | 5/1998 | Chen |
| 5,781,783 A | 7/1998 | Gunther et al. |
| 5,796,978 A | 8/1998 | Yoshioka et al. |
| 5,809,532 A | 9/1998 | Eno et al. |
| 5,901,322 A | 5/1999 | Herbst et al. |

(Continued)

FOREIGN PATENT DOCUMENTS

WO    WO97/37307    10/1997

OTHER PUBLICATIONS

Microsoft Computer Dictionary, Copyright 1999, Microsoft Press, Fourth Edition, p. 12.*

(Continued)

*Primary Examiner*—Pierre Vital
*Assistant Examiner*—Midys Rojas
(74) *Attorney, Agent, or Firm*—Blakely, Sokoloff, Taylor & Zafman LLP (57) ABSTRACT

Parallel cachelets are provided for a level of cache in a microprocessor. The cachelets may be independently addressable. The level of cache may accept multiple load requests in a single cycle and apply each to a respective cachelet. Depending upon the content stored in each cachelet, the cachelet may generate a hit/miss response to the respective load request. Load requests that hit their cachelets may be satisfied therefrom. Load requests that miss their cachelets may be referred to another level of cache.

17 Claims, 4 Drawing Sheets

U.S. PATENT DOCUMENTS

| | | | |
|---|---|---|---|
| 5,913,223 | A | 6/1999 | Sheppard et al. |
| 5,931,951 | A | 8/1999 | Ando |
| 6,041,401 | A | 3/2000 | Ramsey et al. |
| 6,115,793 | A * | 9/2000 | Gruber et al. ............... 711/133 |
| 6,128,704 | A | 10/2000 | Jun |
| 6,167,510 | A | 12/2000 | Tran |
| 6,219,796 | B1 | 4/2001 | Bartley |
| 6,307,281 | B1 | 10/2001 | Houston |
| 6,327,643 | B1 | 12/2001 | Egan |
| 6,349,364 | B1 | 2/2002 | Kai et al. |
| 6,381,671 | B1 * | 4/2002 | Ayukawa et al. ............ 711/104 |
| 6,427,188 | B1 | 7/2002 | Lyon et al. |
| 6,442,667 | B1 | 8/2002 | Shiell et al. |
| 6,449,694 | B1 | 9/2002 | Burgess, Jr. et al. |
| 6,528,974 | B1 | 3/2003 | Mirov et al. |
| 6,549,987 | B1 * | 4/2003 | Rappoport et al. .......... 711/128 |
| 6,608,476 | B1 | 8/2003 | Mirov et al. |
| 2002/0129201 | A1 * | 9/2002 | Maiyuran et al. ........... 711/113 |

OTHER PUBLICATIONS

The Authoritative Dictionary of IEEE Standards Terms, 2000, IEEE Press, Seventh Edition, p. 519.*

Rivers et al, "On High-Bandwidth Data Cache Design for Multi-Issue Processors", IEEE, Proceedings, Micro-30, Dec. 1-3, 1997, Research Triangle Park, North Carolina.

Neefs et al, "A Technique for High Bandwidth and Deterministic Low Latency Load/Store Accesses to Multiple Cache Banks, 6th Int'l. Symposium on High-Performance Computer Architecture HPCA-6, IEEE, 1999, Los Alamitos, California.

Caider et al, "Predictive Sequential Associative Cache", IEEE, Proceedings 2nd Int'l. Symposium on High-Performance Computer Architecture, Feb. 3-7, 1996, San Jose, California.

Cho et al, "Decoupling Local Variable Accesses in a Wild-Issue Superscaler Processor, Proceedings of the 26th Annual Int'l. Symposium on Computer Architecture, May 1999.

Agarwal et al, "Column-Associative Caches: A Technique for Reducing the Miss Rate of Direct-Mapped Caches", Proceedings, The 20th Annual Intl Symposium on Computer Architecture, IEEE Computer Society, Technical Committee on Computer Architecture, Association for Computing Machinery SIGARCH, pp. 169-190, San Diego, California, May 16-19, 1993.

Alexander et al, "Distributed Prefetch-buffer/Cache Design for High Performance Memory Systems", Proceedings, Second Intl Symposium on High-Performance Computer Architecture, IEEE Computer Society, Technical Committee on Computer Architecture, pp. 254-263, San Jose, California, Feb. 3-7, 1996.

Burger et al, "The SimpleScalar Tool Set, Version 2.0", *Computer Sciences Department Technical Report*, No. 1342, The University of Wisconsin, Madison, Wisconsin, Jun. 1997.

Edmondson et al, "Internal Organization of the Alpha 21164, a 300-MHz 64-bit Quad-issue CMOS RISC Microprocessor", *Digital Technical Journal*, vol. 7, No. 1, pp. 119-135, 1995.

Hill, Mark D., "A Case for Direct-Mapped Caches", *Computer*, pp. 25-40, Dec. 1988.

Juan et al, "The Difference-bit Cache", Proceedings, The 23rd Annual Int'l Symposium on Computer Architecture, ACM SIGARCH, IEEE Computer Society, TCCA, pp. 114-120, Philadelphia, Pennsylvania, May 22-24, 1996.

Kessler et al, "Inexpensive Implementation of Set-Associativity", Proceedings, The 16th Annual Intl Symposium on Computer Architecture, IEEE Computer Society Press, pp. 131-139, 1989.

Rau et al, "Pseudo-Randomly Interleaved Memory", Proceedings, The 18th Annual Intl Symposium on Computer Architecture, Association for Computing Machinery, pp. 74-83, Toronto, Canada, May 27-30, 1991.

Rivers et al, "On Effective Data Supply for Multi-Issue Processors", Proceedings, Intl Conference on Computer Design, VLSI in Computers and Processors, IEEE Computer Society Technical Committee on Design Automation, IEEE Circuits and Systems Society, pp. 519-528, Austin, Texas, Oct. 12-15, 1997.

Sánchez et al, "A Locality Sensitive Multi-Module Cache with Explicit Management", Proceedings of the 1999 Intl Conference on Supercomputing, ICS '99, Rhodes, Greece.

Rau et al, "Pseudo-Randomly Interleaved Memory", Proceedings, The 18th Annual Intl Symposium on Computer Architecture, Association for Computing Machinery, pp. 74-83, Toronto, Canada, May 27-30, 1991.

Wilson et al, "Increasing Cache Port Efficiency for Dynamic Superscalar Microprocessors", Proceedings, The 23rd Annual Intl Symposium on Computer Architecture, ACM SIGARCH, IEEE Computer Society, TCCA, pp. 147-157, Philadelphia, Pennsylvania, May 22-24, 1996.

Wilson et al, "Designing High Bandwidth On-Chip Caches", "The 24th Annual Intl Symposium on Computer Architecture, Conference Proceedings, ACM, pp. 121-132, Denver, Colorado, Jun. 2-4, 1997.

Wilton et al, "An Enhanced Access and Cycle Time Model for On-Chip Caches", Digital WRL Research Report 93/5, Palo Alto, California, Jul. 1994.

Shanley, T., *Pentium® Pro Processor System Architecture*, Chapter 5, pp. 61-118, Addison-Wesley Developers Press, 1997.

Black et al, "The Block-Based Trace Cache", Proceedings of The 26th Int'l. Symposium on Computer Architecture pp. 196-207, May 2-4, 1999, Atlanta, Georgia.

Conte et al, "Optimization of Instruction Fetch Mechanisms for High Issue Rates", Proceedings of the 22nd Annual Int'l Symposium on Computer Architecture, pp. 333-344, Jun. 22-24, 1995, Santa Margherita Ligure, Italy.

Dutta et al, "Control Flow Prediction with Tree-Like Subgraphs for Superscalar Processors", Proceedings of The 28th Int'l. Symposium on Microarchitecture, pp. 258-263, Nov. 29-Dec. 1, 1995, Ann Arbor, Michigan.

Friendly et al, "Alternative Fetch and Issue Policies for the Trace Cache Fetch Mechanism", Proceedings of The 30th Annual IEEE/ACM Int'l Symposium on Microarchitecture, pp. 24-33, Dec. 1-3, 1997, Research Triangle Park, North Carolina.

Intrater et al, "Performance Evaluation of a Decoded Instruction Cache for Variable Instruction-Length Computers", Proceedings of the 19th Annual Int'l Symposium on Computer Architecture, pp. 106-113, May 19-21, 1992, Gold Coast, Australia.

Jacobson et al, "Path-Based Next Trace Prediction", Proceedings of the 30th Annual Int'l Symposium on Microarchitecture, pp. 14-23, Dec. 1-3, 1997, Research Triangle Park, North Carolina.

McFarling, Scott, "Combining Branch Predictors", Jun. 1993, WRL Technical Note TN-36, Digital Western Research Laboratory, pp. i-25, Palo Alto, California.

Michaud et al, "Exploring Instruction-Fetch Bandwidth Requirement in Wide-Issue Superscalar Processors", Proceedings of the 1999 Int'l Conference on Parallel Architectures and Compilation Techniques, pp. 2-10, Oct. 12-16, 1999, Newport Beach, California.

Patel et al, "Improving Trace Cache Effectiveness with Branch Promotion and Trace Packing", Proceedings of The 25th Annual Int'l Symposium on Computer Architecture, pp. 262-271, Jun. 27-Jul. 1, 1998, Barcelona, Spain.

Reinman et al, "A Scalable Front-End Architecture for Fast Instruction Delivery", Proceedings of the 26th Int'l Symposium on Computer Architecture, pp. 234-245, May 2-4, 1999, Atlanta, Georgia.

Rotenberg et al, "Trace Cache: A Low Latency Approach to High Bandwidth Instruction Fetching", Proceedings of the 29th Annual IEEE/ACM Int'l Symposium on Microarchitecture, MICRO-29, pp. 24-34, Dec. 2-4, 1996, Paris, France.

Seznec et al, "Multiple-Block Ahead Branch Predictors", Proceedings of the 7th Int'l Conference on Architectural Support for Programming Languages and Operating Systems, pp. 116-127, Oct. 1-4, 1996, Cambridge, USA.

Yeh et al, "Increasing the Instruction Fetch Rate via Multiple Branch Prediction and A Branch Address Cache", Proceedings of the 7th Int'l Conference on Supercomputing, pp. 67-76, Jul. 1993, Ann Arbor, Michigan.

Albonesi, "Selective Cache Ways: On-Demand Cache Resource Allocation" pp. 248-259, IEEE, Nov. 1999.

* cited by examiner

PARALLEL CACHELETS

This application claims the benefit of Provisional Application 60/287,707 filed May 2, 2001

BACKGROUND

The present invention relates to an architecture for cache hierarchies in a computing system.

Contemporary processor designs often address bandwidth constraints imposed by system buses by providing on-chip or on-package cache memory. Various caching schemes are known. Some schemes provide a single unified cache that stores both instruction data and variable data. Other schemes provide multi-level cache hierarchies in which a lowest level cache, the cache closest to the processor core, is very fast but very small when measured against higher level caches. The higher level caches may be increasingly larger and, therefore, may be slower than their lower level counterparts, but their greater capacity tends to reduce data evictions rates and extend the useful life of cached data. To improve hit rates and to avoid cache pollution, still other caching schemes may provide separate instruction and data caches, which enable higher hit rates due to increased code or data locality found in typical application's code and data streams.

Future microprocessors may employ superscalar designs in which multiple instructions will be executed in a single cycle. In this domain, a cache hierarchy that responds only to a single data request per cycle may become a bandwidth-limiting element within the processor. Although some known cache schemes, such as multi-ported or multi-banked caches, can accommodate multiple load requests in a single cycle, these known schemes are difficult to implement. Multi-port architectures are complex and difficult to build as separate circuitry is required to accommodate each additional port. Multi-banked architectures introduce complex circuitry to recognize and manage bank conflicts. Accordingly, the inventors perceive a need in the art for a low-complexity cache hierarchy in which a single level of cache may respond efficiently to multiple load requests per cycle.

DETAILED DESCRIPTION

Embodiments of the present invention provide parallel cachelets in a microprocessor. A single level of cache may include a plurality of independently addressable cachelets. The level of cache may accept multiple load requests in a single cycle and apply each to a respective cachelet. Depending upon the content stored in each cachelet, the cachelet may generate a hit/miss response to the respective load request. Load requests that hit their cachelets may be satisfied therefrom. Load requests that miss their cachelets may be referred to another level of cache.

Figure 1:
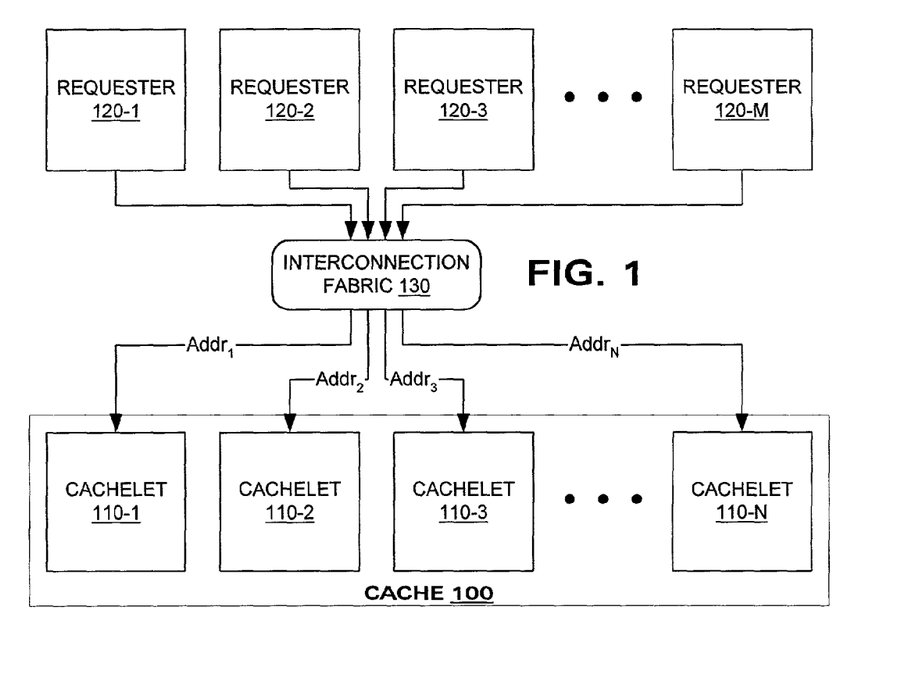
FIG. 1 is a block diagram of a parallel cache design according to an embodiment of the present invention.

FIG. 1 is a block diagram of a parallel cache 100 according to an embodiment of the present invention. The parallel cache 100 may include a plurality of cachelets 110-1 through 110-N, each storing data for use by other elements of an agent in which it sits. Each cachelet (say, 110-1) may be addressed independently of each other cachelet. Thus, the cachelet 110-1 may receive an address signal (addr1) on an input that is independent from each other input. The cachelet 110-1 may generate a hit/miss response indicating whether the requested data is present within the cachelet and, if the data is present, may output the data from the cache in a response.

FIG. 1 illustrates the cache 100 integrated into a larger system. Plural load requests may be issued by one or more requesters 120-1 through 120-M. Although the four requesters are illustrated in the example of FIG. 1 along with four cachelets, these numbers are coincidental. The number of cachelets 110-1 to 110-N may but need not be the same as the number of requesters 120 provided in the agent.

FIG. 1 also illustrates an interconnection fabric 130 providing communication between the requesters 120 and the cachelets 110-1 to 110-N. The interconnection fabric manages load requests issued from the requesters 120 and forwards load requests to each of the cachelets 110-1 to 110-N. In an embodiment, the interconnection fabric may be provided within the cache 100. In other embodiments, the interconnection fabric may be external to the cache 100. In another embodiment (not shown in FIG. 1), the interconnection fabric may be omitted altogether.

The cache design of FIG. 1 advantageously provides a cache in which multiple load requests may be satisfied in a single cycle. Each load request may be applied to a respective cachelet 110.1–110.N. If the load hits the cachelet, the data may be supplied to the requester. If not, the load may be referred to another level of cache (not shown) or to system memory (also not shown).

Figure 2:
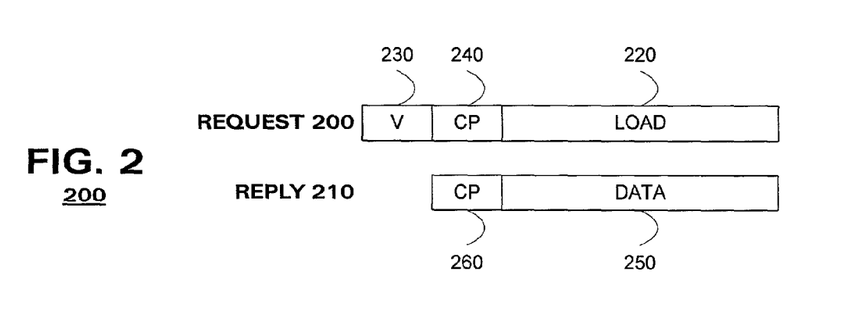
FIG. 2 illustrates a format of data exchange that may occur between requesters and the cache, according to an embodiment of the present invention.

FIG. 2 illustrates a format of data exchange that may occur between requesters and the cache, according to an embodiment of the present invention. As shown in FIG. 2, communication may occur according to a request 200 and reply 210 communication protocol. Such protocols are well-known and widely used in modern processing agents. Conventionally, a request 200 would include a load request identifying, for example, a request type identifying the uses to which the requester will put the requested data (e.g., read, read for ownership, etc.) and an address of the requested data (fields not shown).

Requests 200, according to an embodiment, may include a field 220 for conventional load data and additionally may include a valid field 230 and a cachelet pointer ("CP") field 240. In an embodiment, the cachelet pointer 240 may identify a cachelet within the cache to which the request 200 is directed. The valid field 230 may identify whether data in the cachelet pointer 240 is valid.

When a reply by the cache 100 furnishes data 250 in response to a request. The reply may identify a cachelet from which the data was furnished. Thus, replies from the cache 100 also may include a cachelet pointer 260 identifying the cachelet that furnished the data.

Figure 3:
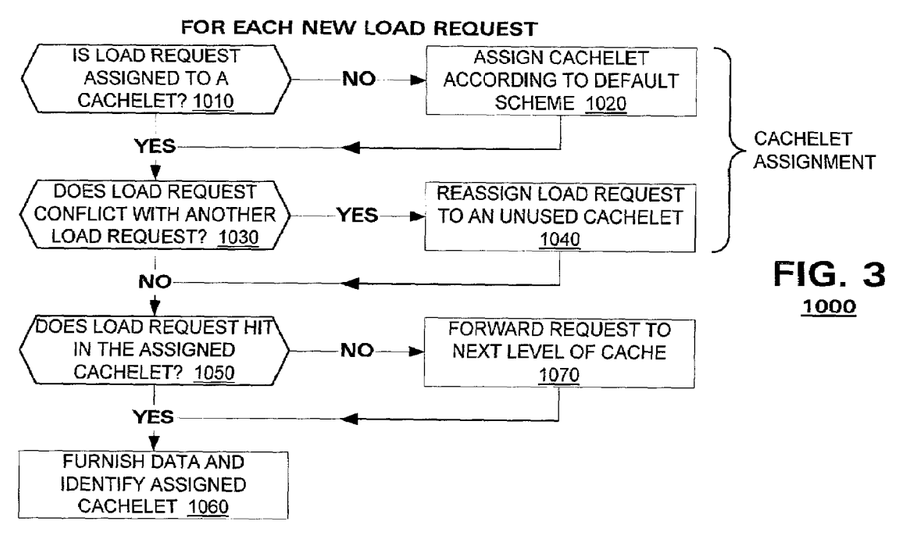
FIG. 3 illustrates a method of operation suitable for use in an embodiment that permits a dynamic assignment of cachelets to new requests.

FIG. 3 illustrates a method of cachelet assignment according to an embodiment of the present invention. The method may begin be determining whether the load request is addressed to a cachelet (box 1010). This determination may be made by checking the valid bit of the request. If not, a cachelet assignment may be made according to a default assignment scheme (box 1020). For example, a cachelet may be assigned to the load request according to a round-robin or least-recently-used assignment scheme. Thereafter, or if the load request was addressed to a cachelet, the method may determine whether the load request conflicts with another load request (box 1030). If two load requests conflict, if they both are addressed to the same cachelet, then one of the load requests is assigned to an unused cachelet (represented by box 1040).

Once all load requests are assigned to a cachelet, a lookup may be performed at each cachelet. Each cachelet may determine whether its respective load request hits the cachelet (box 1050). If so, the requested data may be read from the cachelet and furnished to the requester (box 1060). If not, the load request may advance to other layers of cache, possibly to system memory, until the requested data is found and stored in the cachelet (box 1070). Thereafter, the requested data is furnished to the requester (box 1060). When data is returned to the requesters, it may include a cachelet pointer identifying the cachelet that furnished the data.

By way of example, consider operation of the method 1000 when a plurality of loads $L_1$–$L_{12}$ are received for the first time. Each of the loads may be assigned to a respective cachelet according to the default scheme. When data is returned in response to the loads, a CP pointer may identify the cachelet assignment that was made for the respective load. New loads may continue to be assigned cachelets according to a round-robin scheme. Thus, in this example, loads $L_1$–$L_{12}$ after having been delivered to the cache 100 for the first time, may have been given cachelet assignments as shown below in Table 1.

TABLE 1

| LOAD | VALID BIT | CACHELET POINTER | CACHELET ASSIGNMENT |
|---|---|---|---|
| $L_1$ | Invalid | — | 0 |
| $L_2$ | Invalid | — | 1 |
| $L_3$ | Invalid | — | 2 |
| $L_4$ | Invalid | — | 3 |
| $L_5$ | Invalid | — | 0 |
| $L_6$ | Invalid | — | 1 |
| $L_7$ | Invalid | — | 2 |
| $L_8$ | Invalid | — | 3 |
| $L_9$ | Invalid | — | 0 |
| $L_{10}$ | Invalid | — | 1 |
| $L_{11}$ | Invalid | — | 2 |
| $L_{12}$ | Invalid | — | 3 |

Table 1 also illustrates contents of the valid bit and cachelet pointer of the loads $L_1$–$L_{12}$ as they might be presented to the cache.

Of course, due to the dynamic behavior of programs, the grouping of loads can be expected to vary significantly. There can be no expectation that new loads will be presented to a cache simultaneously or that a grouping of loads that were presented collectively to the cache in one cycle will be presented as a group in some later cycle.

Consider an example wherein loads $L_3$, $L_4$, $L_7$ and a new load, $L_{13}$, are presented to the cache 100 in a single cycle. The content of the valid bit and the cachelet pointer of these load is illustrated in Table 2.

TABLE 2

| LOAD | VALID BIT | CACHELET POINTER | CACHELET ASSIGNMENT |
|---|---|---|---|
| $L_3$ | Valid | 2 | 2 |
| $L_4$ | Valid | 3 | 3 |
| $L_7$ | Valid | 2 | 1 |
| $L_{13}$ | Invalid | — | 0 |

Loads $L_3$ and $L_7$ present a conflict; both are addressed to cachelet 2. Load $L_{13}$ is new, it may be assigned to the next cachelet in the round-robin scheme, cachelet 0. To resolve the conflict between loads $L_3$ and $L_7$, one may be presented to cachelet 2; the other may be assigned to an unused cachelet. In the example shown in Table 2, load $L_7$ is shown as being assigned to cachelet 1. Thereafter, each load may be applied to its respective cachelet to determine whether requested data is present therein. If so, the cachelet may furnish the requested data to the requester and identify the cachelet in which the requested data was found.

In the example of Table 2, load $L_7$ is shown being redirected from cachelet 2 to cachelet 1. Although a load may be redirected, the load need not always miss the new cachelet. It is possible, due to processing of other loads, that the data sought by load $L_7$ will be present in the cache. Embodiments of the present invention permit multiple copies of the same data to be present in more than one cachelet.

Redirection of loads in the presence of a cachelet conflict can improve bandwidth for load requests. Without such redirection, given the conflict shown in Table 2, only one of the loads $L_3$ or $L_7$ could be granted. If load $L_3$ were granted, load $L_7$ would have to be stalled until the address cachelet completed processing for load $L_3$. Redirection permits the load $L_7$ to be granted also, even in the face of the cachelet conflict. With redirection, the load $L_7$ may be applied and unused cachelet and, if the cachelet stores the requested data, the load may be satisfied earlier than if it were stalled.

Figure 4:
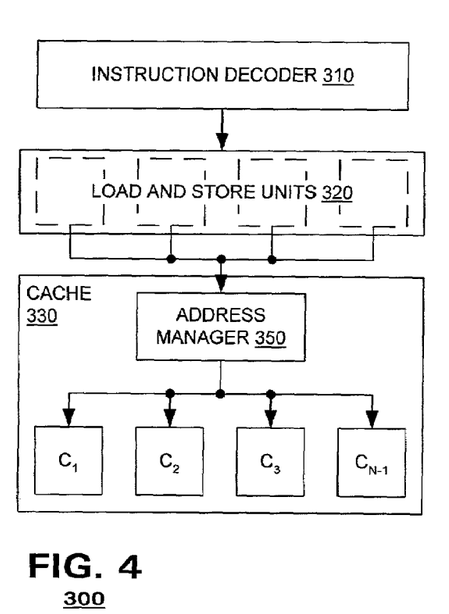
FIG. 4 is a block diagram of a data processing system according to an embodiment of the present invention.

FIG. 4 is a block diagram of a data processing system according to an embodiment of the present invention. The system 300 may include an instruction decoder 310, one or more load/store units 320 and a cache 330. The decoder 310 decodes program instructions. It may pass load instructions to the load/store units 320 for execution. In this regard, the operation of the system 300 is well known.

The cache 330 may include cachelets 340 as described above and an address manager 350. The address manager 350 may perform cachelet assignment as described herein. In the embodiment shown in FIG. 4, cachelet assignment may occur at execution. As a load instruction is being executed, the load/store units pass load requests to the cache. The address manager 350 may receive the load requests and perform cachelet assignments as the requests are being received.

Figure 5:
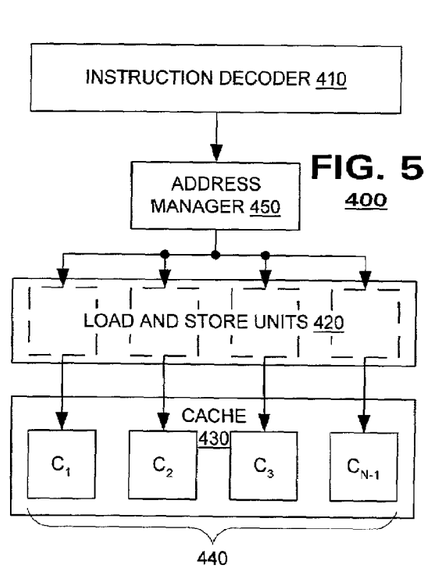
FIG. 5 is a block diagram of a data processing system 400 according to an alternate embodiment of the present invention.

FIG. 5 is a block diagram of an alternate embodiment of a data processing system 400 according to the present invention. This embodiment 400 also may include an instruction decoder 420, one or more load/store units 420 and a cache 430. In this embodiment, however, each of the load/store units 420 may be mapped to only one of the cachelets 440 within the cache.

In this embodiment, a cachelet manager may be provided in a communication path between the instruction decoder 410 and the load/store units 420. Cachelet assignment functions may occur as load instructions are passed to the load/store units 420.

Providing cachelet assignment functions at instruction execution as in FIG. 4 allows dynamic information to be used than when cachelet assignment functions are performed at instruction decoding. When instruction execution is performed out of order, instruction may be executed as soon as execution resources and data dependencies are resolved. Instead of assigning cachelet to loads that are concurrently decoded, the embodiment of FIG. 4 performs cachelet assignments on concurrently executing loads. Simulation studies suggest that the embodiment of FIG. 4 may outperform the embodiment of FIG. 5. Alternatively, however, the embodiment of FIG. 5 removes an interconnection network between the load/store units and the cachelets. The embodiment of FIG. 5, therefore, benefits from a simpler implementation. Because the address manager is not part of the load execution, the embodiment of FIG. 5 may reduce cache access latency and possibly cycle time.

Figure 6:
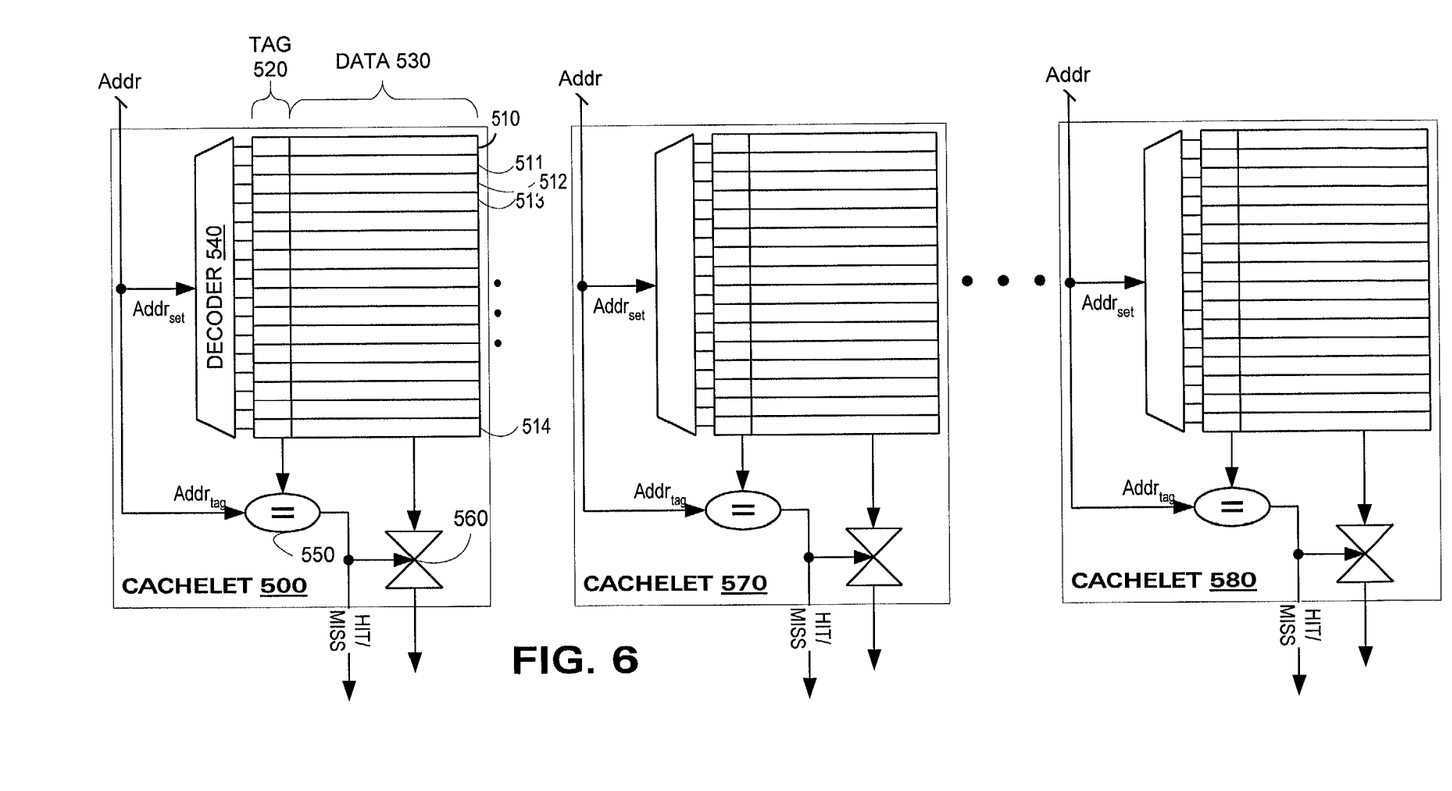
FIG. 6 is a block diagram of a cachelet 500 according to an embodiment of the present invention.

FIG. 6 is a block diagram of a cachelet 500 according to an embodiment of the present invention. The cachelet 500 may include a plurality of cache lines 510–514. Each cache line may include a set field 520 and a tag field 530 each of a predetermined length. During operation, within a particular set, the tag field 520 may store a "tag" representing a portion of the data's address. The data field 530 may store the data itself.

The cachelet 500 may include an address decoder 540. The address decoder may index one of the sets 510–214 in response to an address signal applied on an input 550 to the cachelet 500. During a write of data to the cachelet 500, the address decoder activates one of the cache lines (say, 511) identified by the address signal, causing data to be stored in the cache line 511. During a read of data from the cachelet 500, activation of the cache line 511 may the cache line 511 to output stored data from the cachelet 500. Typically, only a portion of a complete address is used to activate a cache line 511; FIG. 1 labels this data $Addr_{set}$. According to convention, the cache line 511 activated in response to the address signal is called a "set."

The cachelet 500 also may include a tag comparator 550, having two inputs. A first input is provided in communication with the tag field 530 of each of the cache lines 511–214. A second input receives a portion of the address signal, called "$Addr_{tag}$" in FIG. 1. During a read operation, when a new address signal is applied to the cachelet 500, the set information $Addr_{set}$ will activate one of the cache lines 511 and cause tag data therefrom to be output to the tag comparator 550. Thus, the tag comparator 550 may compare an externally supplied tag with tag data stored in an addressed cache line. When the two tags agree, the tag comparator 550 may generate an output identifying a tag hit; otherwise, the tag comparator may generate an output indicating a miss.

The cachelet 500 also may include a gate 560 coupled to the output of the cache lines 511–214 and controlled by the tag comparator 550. The gate 560 may be rendered conductive in response to a cache hit but non-conductive in response to a cache miss. Thus, the gate 560 may permit the cachelet 500 to output data only when requested data is present in the cachelet 500.

The cachelet structure may be repeated for each of the cachelets in a layer of cache. Structures for multiple cachelets 500, 570 and 580 are illustrated in FIG. 6.

The cachelet structure illustrated in FIG. 6 shares much in common with traditional set associative caches. Conventional set associative caches typically include a set of cache banks arranged in ways. All ways in set associative caches, however, are addressed by the same address during cache lookups. They cannot process multiple loads in a single clock cycle. By contrast, each of the cachelets 500, 570 580 may be addressed independently of each other and, therefore, have the potential to process multiple loads per cycle.

An interesting aspect of the behavior of the parallel cachelets is that they provide a form of implicit set associativity. Since the same entry of all the cachelets can hold different data, an implicit form of set associativity may be constructed within a cache. Even if the cachelets are direct mapped, if two loads with addresses that would normally be direct mapped to the same entry of a cache actually are assigned different cachelets, then both loads can be satisfied. This effectively allows the parallel cachelets to behave as a set associative cache, with the same entry of all the cachelets forming a set. The number of cachelets determines the maximum number of "ways" of the implicit set associativity. However, this is not quite the same as normal set associativity in that there is less flexibility in the use of the entries of a set. Also, the replacement policy within the set is determined by the cachelet assignment process; effectively, it may become random and not LRU as is found in traditional set associative caches.

Complementing implicit set associativity, the parallel cachelet scheme also provides a form of on-demand replication that can facilitate concurrent memory accesses. Replication allows multiple dynamic loads to access the same data concurrently in multiple cachelets. The replication also decreases the potential for cachelet conflicts. It is possible, however, that too much replication can become wasteful and can reduce cachelet hit rates.

Hence, the parallel cachelet scheme provides two important attributes: on-demand replication of data in multiple cachelets to provide increased bandwidth (simulating multiporting); and implicit set associativity that allows different data to be stored in the same entry of different cachelets to provide better overall hit rate (simulating set associativity).

Figure 7:
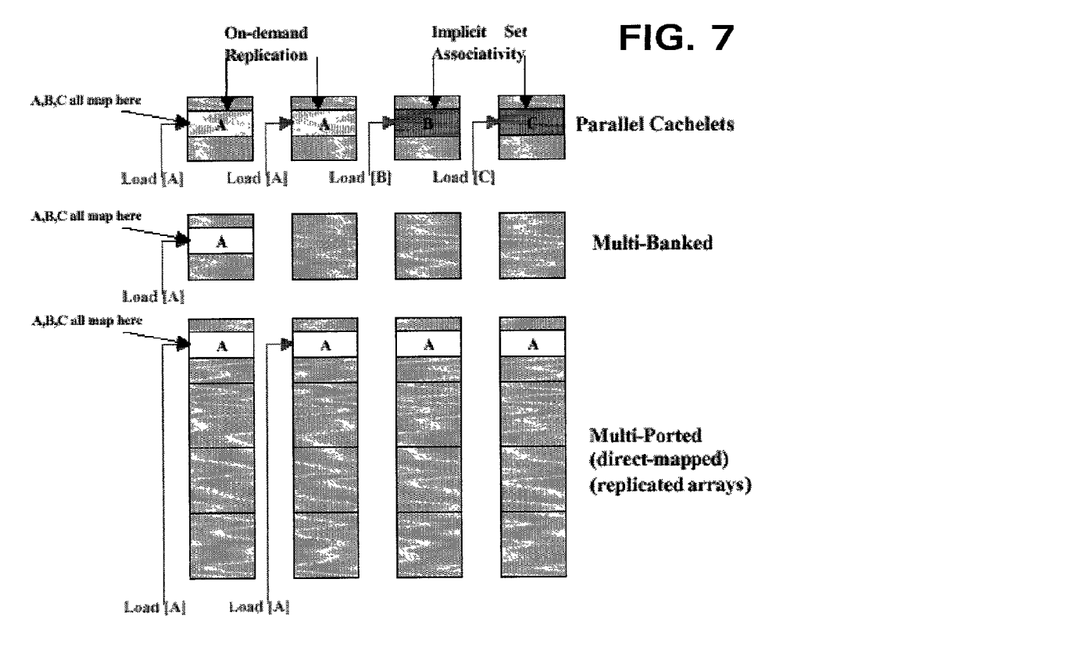
FIG. 7 illustrates multi-port simulation and implicit set associativity properties the may be achieved by a parallel cachelet architecture.

FIG. 7 provides an example illustrating these two attributes. Assume all the cache schemes employ direct-mapped addressing, and that addresses A, B, and C all map to the same cache set. Assume that in a particular machine cycle i, there are four dynamic loads with addresses: A, A, B, and C. Both the multi-banked and multi-ported schemes will only be able to provide one data element due to their direct mapped addressing. The parallel cachelet scheme has the potential to support accessing to all three addresses, A, B, and C, if they are assigned to different cachelets (implicit set associativity). Furthermore, the parallel cachelet scheme permits multiple copies of the same data element in A to exist within the cache (on-demand replication). Hence the parallel cachelet scheme has memory accessing flexibility that can adapt to dynamic program behavior. The parallel cachelet scheme can actually outperform a direct-mapped multi-ported cache for some benchmarks due to implicit set associativity and on-demand replication.

Figure 8:
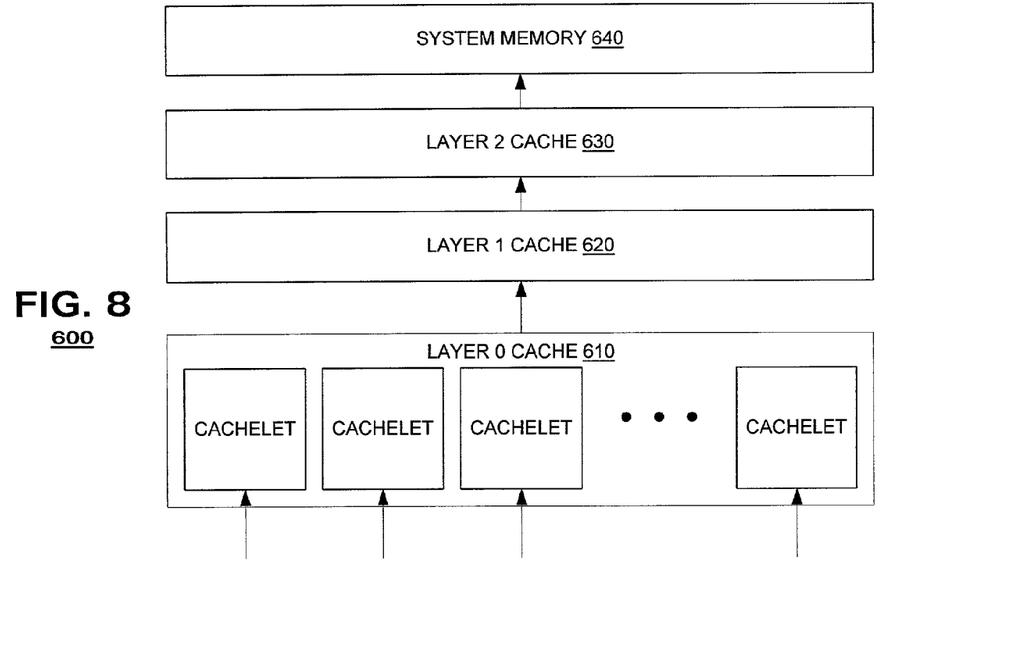
FIG. 8 illustrates a cache hierarchy of an agent according to an embodiment of the present invention.

FIG. 8 illustrates a cache hierarchy 600 of an agent according to an embodiment of the present invention. The cache hierarchy 600 shares much in common with conventional cache hierarchies: multiple levels 610, 620 and 630 of cache (labeled Layer 0–Layer 2) may be provided between an agent's core (not shown) and system memory. Each successively higher layer of cache may be larger than the lower level caches but they can be slower than the lower level caches as well. Thus, a Layer 0 cache provided closest to the core may be very small (say, storing 8 kilobytes of data) but able to retrieve and furnish data at clock speeds that rival the faster clock speeds of the core itself. Increasingly higher level caches, layer 1 and layer 2 caches 620, 630, may store greater amounts of data (640 kilobytes and 2 megabytes) but must operate at relatively slower clock speeds.

During operation, when a load instruction is being executed, a load request first is applied to cache layer 0. If the request hits the layer 0 cache, it furnishes the data. Otherwise, if the request misses the layer 0 cache, the request is applied to the level 1 cache. Each level of cache performs a cache lookup (determines a hit or a miss) and furnishes the data if it is able to do so. Otherwise, the request advances to successively higher levels of cache until it is determined that no cache stores the requested data. In this event, the data is requested from system memory (represented as 640 in FIG. 8). In this regard, the architecture and operation of cache hierarchies is well known.

According to an embodiment, one or more of the layers of cache may have an architecture according to the parallel cachelet scheme. Cache layer 0 610 is shown as comprising parallel cachelets. In this case, when data requests are applied to cache layer 0 610, each request may be assigned and applied to a respective cachelet. If a request misses the cachelet, it may be applied to the layer 1 cache 620. The layer 1 cache 620 may be (but need not be) provisioned according to the parallel cachelet architecture.

Store instructions may be treated differently from loads. In an embodiment, the parallel cachelets may operate according to a write-through and write-no-allocate policy. When a store retires, its data may be broadcast to all cachelets in a layer to update them. Each cachelet may perform an independent tag match. Those cachelets that register a tag match may store the newly broadcast data in the corresponding set. Retiring stores interfere with overall performance only when store retirement is holding up the pipeline.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A cache assignment method, comprising:
  receiving plural data requests, each associated with respective cachelet pointers,
  determining whether any of the cachelet pointers conflict with any other cachelet pointers,
  if a conflict occurs among cachelet pointers, forwarding one of the data requests associated with a conflicting cachelet pointer to the identified cachelet, and
  reassigning data requests associated with remaining conflicting cachelet pointers to unused cachelets.

2. The cache assignment method of claim 1, the method further comprising forwarding any data requests associated with non-conflicting cachelet pointers to cachelets identified by the respective pointers.

3. The cache assignment method of claim 1, wherein multiple data requests having a common set address are forwarded to different cachelets.

4. The cache assignment method of claim 1, further comprising:
  determining whether any of the cachelet pointers are valid,
  forwarding data requests having valid, non-conflicting cachelet pointers to the addressed cachelet, and
  assigning data requests of non-conflicting cachelet pointers to unused cachelets according to a default assignment scheme.

5. The cache assignment method of claim 1, wherein copies of a single data item may be stored in multiple cachelets.

6. The cache assignment method of claim 1, further comprising forwarding the reassigned data requests in parallel with the other forwarded data requests.

7. A cache assignment method, comprising:
  receiving plural data requests and associated cachelet pointers, the cachelet pointers addressing one of a plurality of cachelets within a cache,
  determining whether any of the cachelet pointers conflict with any other cachelet pointers,
  forwarding non-conflicting data requests to a cachelet identified by the cachelet pointer,
  for the conflicting data requests, forwarding one of the conflicting data requested to the identified cachelet and
  reassigning remaining conflicting data requests to unused cachelets.

8. The cache assignment method of claim 7 wherein the data requests are associated with respective cachelet pointers, the method further comprising:
  determining whether any of the cachelet pointers are valid, and
  assigning remaining data requests to unused cachelets according to a default assignment scheme.

9. The cache assignment method of claim 7, further comprising forwarding the reassigned data requests in parallel with the non-conflicting data requests and the one conflicting data request.

10. A cache assignment method, comprising:
  receiving plural data requests and associated cachelet pointers, the cachelet pointers addressing one of a plurality of cachelets within a cache,
  determining whether any of the cachelet pointers are valid,
  forwarding data requests having valid cachelet pointers to the addressed cachelet, and
  reassigning remaining data requests to unused cachelets according to a default assignment scheme.

11. The cache assignment method of claim 10, further comprising:
  determining whether any of the cachelet pointers conflict with any other cachelet pointers,
  forwarding any data requests associated with non-conflicting cachelet pointers to cachelets identified by the respective pointers.

12. The cache assignment method of claim 10, further comprising:
  if a conflict occurs among cachelet pointers, forwarding one of the data requests associated with a conflicting cachelet pointer to the identified cachelet, and
  reassigning data requests associated with remaining conflicting cachelet pointers to unused cachelets.

13. The cache assignment method of claim 10, further comprising forwarding the reassigned data requests to the unused cachelets in parallel with the other forwarded data requests.

14. A cache assignment method, comprising:
  receiving plural data requests, wherein the data requests are associated with respective cachelet pointers,
  determining whether any of the cachelet pointers are valid,
  forwarding data requests having valid cachelet pointers to the addressed cachelet, and
  reassigning remaining data requests to unused cachelets according to a default assignment scheme.

15. The cache assignment method of claim 14, wherein each data request includes a cachelet pointer, the method further comprising forwarding any data requests associated with non-conflicting cachelet pointers to cachelets identified by the respective pointers.

16. The cache assignment method of claim 14, the method further comprising:
receiving plural data requests, each associated with respective cachelet pointers,
determining whether any of the cachelet pointers conflict with any other cachelet pointers,
if a conflict occurs among cachelet pointers, forwarding one of the data requests associated with a conflicting cachelet pointer to the identified cachelet, and
reassigning data requests associated with remaining conflicting cachelet pointers to unused cachelets.

17. The cache assignment method of claim 14 further comprising forwarding the reassigned data requests in parallel with the forwarding of data requests having valid cachelet pointers.

\* \* \* \* \*